(12) United States Patent
Norais et al.

(10) Patent No.: US 11,091,090 B2
(45) Date of Patent: Aug. 17, 2021

(54) LIGHTING DEVICE

(71) Applicant: PSA AUTOMOBILES SA, Poissy (FR)

(72) Inventors: Marc Norais, Sartrouville (FR); Damien Schnuriger, Massy (FR); Guillaume Royer, Bruyeres le Chatel (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/646,912

(22) PCT Filed: Sep. 28, 2018

(86) PCT No.: PCT/FR2018/052399
§ 371 (c)(1),
(2) Date: Mar. 12, 2020

(87) PCT Pub. No.: WO2019/073141
PCT Pub. Date: Apr. 18, 2019

(65) Prior Publication Data
US 2020/0298752 A1    Sep. 24, 2020

(30) Foreign Application Priority Data

Oct. 13, 2017  (FR) ..................................... 1759630

(51) Int. Cl.
*B60Q 3/51* (2017.01)
*F21V 23/00* (2015.01)
*F21Y 115/10* (2016.01)

(52) U.S. Cl.
CPC .............. *B60Q 3/51* (2017.02); *F21V 23/005* (2013.01); *F21Y 2115/10* (2016.08)

(58) Field of Classification Search
CPC ... F21V 23/04–0492; F21V 23/03–009; B60Q 3/51; B60Q 3/80–88; B60Q 1/2696
See application file for complete search history.

(56) References Cited

U.S. PATENT DOCUMENTS

| | | | |
|---|---|---|---|
| 2007/0211483 A1 | 9/2007 | Ando et al. | |
| 2018/0212603 A1* | 7/2018 | Kwak | ....................... B60Q 3/82 |

FOREIGN PATENT DOCUMENTS

| | | | |
|---|---|---|---|
| CN | 105650570 A | * | 6/2016 |
| CN | 110285395 A | * | 9/2019 |

(Continued)

OTHER PUBLICATIONS

International Search Report for PCT/FR2018/052399 dated Feb. 1, 2019.
Written Opinion for PCT/FR2018/052399 dated Feb. 1, 2019.

*Primary Examiner* — Mariceli Santiago
(74) *Attorney, Agent, or Firm* — Sandberg Phoenix & von Gontard, P.C.

(57) ABSTRACT

A lighting device (1) comprising a housing (2) accommodating at least one light source (14), said housing (2) comprising an at least partially transparent wall (6) supporting a touch interface (7) for controlling the light source (14) and allowing through the light generated by the light source (14), and a cover (3) closing the housing (2); the assembly formed by the housing (2) and the cover (3) being tightly assembled by clipping means (4), said lighting device (1) further comprising a flexible mechanical and electrical connection means (20) compressed between the touch interface (7) and the light source (14) allowing both control of the light source (14) and compensation of the stresses exerted by the clipping means (14).

11 Claims, 1 Drawing Sheet

(56) References Cited

FOREIGN PATENT DOCUMENTS

| CN | 110466418 A | * | 11/2019 |
|---|---|---|---|
| EP | 2845771 A1 | | 3/2015 |
| FR | 3026692 A1 | | 4/2016 |
| GB | 2425590 A | | 11/2006 |
| WO | 2013172526 A1 | | 11/2013 |

* cited by examiner

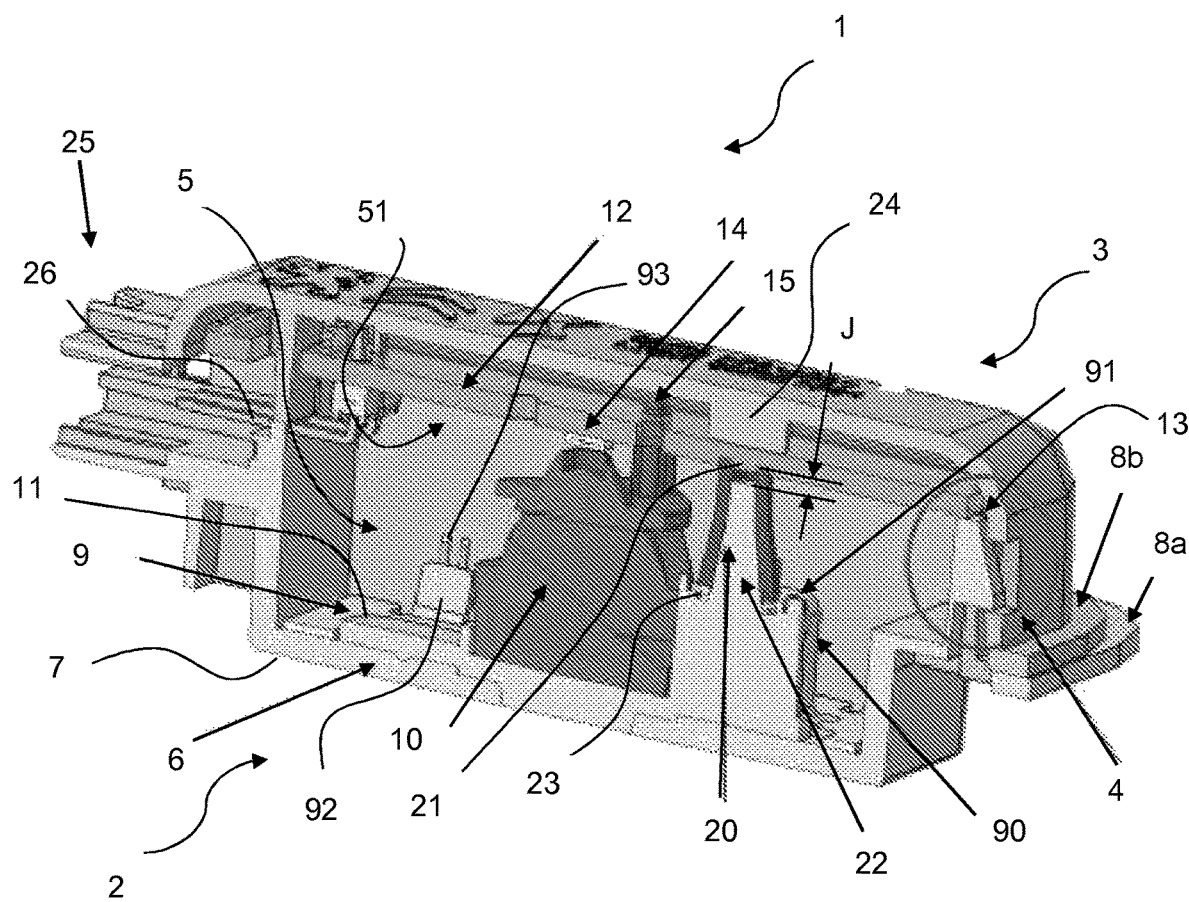

LIGHTING DEVICE

CROSS-REFERENCE TO RELATED APPLICATIONS

This application is the US National Stage under 35 USC § 371 of International Application No. PCT/FR2018/052399, filed 28 Sep. 2018 which claims priority to French Application No. 1759630 filed Oct. 13, 2017, both of which are incorporated herein by reference.

BACKGROUND

The invention relates to a lighting device.

The invention applies in particular to the field of interior lighting of a closed space such as the passenger compartment of a motor vehicle, and more particularly to ambient lighting devices, ceiling lights and reading lights.

FR3026692, in particular, discloses a device for lighting a vehicle passenger compartment, of the ceiling light or reading light type, comprising one or more light sources, in particular LEDs supported on an electronic board (printed circuit board or PCB); these sources being covered by a device for optically diffusing the light generated by the light source or sources.

The lighting is controlled via a touch interface comprising a transparent contact surface or touch surface for allowing through the light generated by the LEDs.

The touch interface is capacitive or resistive, translating the touch on the touch surface by the user's finger into a control signal for the lighting. The mode of operation of a touch interface, which is well-known to a person skilled in the art, will not be described in detail in the present description.

All of the elements are mounted in a housing, the cover of which is provided with esthetic elements (glass, mask, etc.). In this device, the touch interface is mounted on the housing by a set of runners and corresponding grooves. In terms of the mounting operation itself (centering, locking in position, etc.) and reducing the plays, this is not an optimal solution.

SUMMARY OF THE INVENTION

The invention aims to facilitate mounting the device and to make its vibration-resistance more robust, and thus to ensure the electrical contact between the light sources and the touch interface for controlling the lighting.

For this purpose, the device makes use of a mechanical clipping assembly, which makes simple, "blind" mounting possible.

An assembly of this type usually requires refinement off-site to find the correct compromise between the wear-resistance of the parts and the clipping strain.

In particular, in spite of all the effort involved in this type of assembly, noise problems from vibration of one of the parts and creaking problems from movement of one part with respect to another, for example by rolling, may occur and detract from the quality as perceived by the user.

Also, as a result, the electrical contact between the touch surface and the board cannot be ensured.

The tolerance ranges for each part do not allow assembly with "zero" play to be provided. The assembly is thus mounted either under stress, with the risk of breaking or unsoldering the electrically conductive mechanical parts, or with play, with a risk of noise caused by this play.

To overcome these drawbacks, a lighting device is provided which comprises a housing accommodating at least one light source, said housing comprising an at least partially transparent wall supporting a touch interface for controlling the light source and allowing through the light generated by the light source, and a cover closing the housing; the assembly formed by the housing and the cover being tightly assembled by clipping means, said lighting device further comprising a flexible mechanical and electrical connection means compressed between the touch interface and the light source, allowing both control of the light source and compensation of the stresses exerted by the clipping means.

In one feature, the housing has a shape of a bowl, the base wall of which supports the touch interface and the opening of which is closed by a printed circuit board supporting the light source; the light source being oriented toward the base wall.

In another feature, the touch interface comprises a conductive surface fitting tightly against the base wall, comprising at least one conductive part extending from the conductive surface toward the printed circuit board; the free end of said conductive part defining an electrical contact involved in the transmission of a lighting control signal to the printed circuit board to control the lighting of the light source.

In another feature, the mechanical and electrical connection means is arranged between the electrical contact and the printed circuit board.

In another feature, the mechanical and electrical connection means is a hollow tubular elastomer sleeve, loaded with conductive pigments, the density of which is determined so as to provide electrical continuity between the electrical contact and the printed circuit board.

In another feature, the cover comprises a stop that exerts a contact force on the printed circuit board; said stop being centered on the tubular sleeve.

In another feature, an optical device is arranged between the base wall and the printed circuit board facing the light source, so as to guide the light as far as the base wall; said optical device comprising a light input face facing the light source and a light output face facing the base wall.

In another feature, the optical device comprises at least one centering pin cooperating with the printed circuit board so as to center the light input face of the optical device on the light source.

Additionally, a motor vehicle is disclosed comprising at least one lighting device as described above, arranged within the passenger compartment of the motor vehicle.

In one feature, the lighting device is a reading light or ceiling light.

PRESENTATION OF THE DRAWINGS

Further features and advantages of the present invention will become apparent upon reading the following non-limiting description, referring to the sole drawing (FIG. 1), which is a perspective sectional view of an embodiment of a lighting device.

DETAILED DESCRIPTION

In the following description, "interior" or "internal" shall refer to all elements or surfaces located within the lighting device and, by contrast, "exterior" or "external" shall refer to all elements or surfaces located outside the lighting device.

Likewise, the terms "upper" and "lower" are considered with reference to the orientation of the lighting device as shown in FIG. 1.

An embodiment of a lighting device 1, which may be a reading light or a ceiling light, is shown with reference to the sole drawing (FIG. 1) in a perspective section presenting the different elements of the lighting device 1.

This lighting device 1 comprises a housing 2 closed by a cover 3. It is noted here that the designation of housing and cover is a simple convention and may be reversed, the housing becoming the cover and vice versa.

The assembly 1 formed by clipping the housing 2 and the cover 3 together with clipping means. Only one of the four clipping means 4 is visible in the embodiment of FIG. 1. The four clipping means 4 are provided on the four corners of the housing 2, which has a general rectangular parallelepiped shape.

The clipping means 4 comprises, in a known manner, resiliently deformable feet (or clips), integral with the housing 2, which are respectively terminated by stops having guide ramps and respectively cooperating with opposing stops defined by the opening edges arranged at the four corners of the cover 3. The cover 3, just like the housing 2, has a general rectangular parallelepiped shape.

With clipping means of this type, once the assembly is complete there is no longer any play between the housing 2 and the cover 3.

The housing 2 has a general shape of a bowl 5 having an opening 51 and a base wall 6 that, in this embodiment, is planar and at least partially transparent so as to be traversable by the light from the light source described below, while masking the interior of the housing for a user present in the passenger compartment. The base wall 6 also defines a touch surface 7 of a touch interface for the lighting control.

Only the base wall 6 of the housing 2 is visible and accessible to the passengers of the vehicle for controlling the lighting when it is mounted in the passenger compartment.

The housing 2 also has a peripheral support flange 8a that receives a corresponding support flange 8b of the cover 3. The two flanges 8a,b are held pressed together by clipping means 4.

The housing 2 and the cover 3 thereof are obtained in a known manner by injection molding of plastic material.

The partially transparent base wall 6 is obtained by bi-material injection, for example of PC (polycarbonate) and ABS (acrylonitrile butadiene styrene).

The various elements contained in the housing 2 (internal elements) are now described in the order of assembly in the housing 2, by describing the shape thereof, the function thereof, and the interfacing thereof with the other elements of with the housing 2 and the cover 3.

The housing 2 receives, on the internal face of the base wall 6, an electrically conductive metal plate 9, also designated as an "antenna," which along with the touch surface 7 is involved in the definition of the touch interface of the lighting device 1 and thus in the lighting control. The external contour of the conductive plate 9 fits tightly against the internal contour of the inner face of the base wall 6. The external contours have the general shape of a rectangle.

Said antenna 9 comprises four tongues 92, extending in pairs, respectively at the ends and from the lateral edges of the plate. The tongues 92 are folded substantially at 85° to the principal plane of the metal plate. A single tongue 92 is shown in the drawing. The housing 2 comprises EPDM (ethylene-propylene-diene monomer) grooves 93, on which the tongues 92 come to press under stress during assembly. The EPDM also eliminates any risk of squeaking after mounting. Two mutually parallel grooves 93 are arranged in the housing 2, opposite each of the tongues 92. The grooves 93 are integral with the housing 2. Only two grooves 93 are shown in the drawing.

The conductive plate 9 is opened in the central part thereof so as to allow an optical device or guide 10 to pass through, which is received in the central region of the inner face of the base wall 6 of the housing 2. The inner face of the base wall comprises a boss 11 in this region. The boss 11 is obtained by local thickening of the base wall 6. The boss 11 also serves as a centering stop for the conductive plate 9. In a variant, the boss 11 is obtained from the thickness of an insert glued or welded to the base 6 of the housing 2. This insert 11, also designed as a "pane," has to be transparent so as to allow light there through while masking the interior of the housing 2 for a user present in the passenger compartment.

The optical device 10 is shaped to define a light guide for the light generated by a light source 14 of the lighting device 1. The optical device or guide 10 is formed, for example, from a crystal PC material. The output face of the light guide 10 is centered on the central region of the inner face of the base wall 6. The input face of the light guide 10, which is parallel with the plane of the opening 51 of the housing 2, is shaped to concentrate the beam of light generated by the lighting source 14 while limiting the escape of light into the housing 2. The light guide 10, of a general elliptical shape, subsequently directs the beam towards the output face thereof, which flares out as far as the interface with the central region of the base wall 6, which is transparent to the beam, so as to diffuse the lighting toward the exterior of the housing 2, in other words into the passenger compartment when the housing 2 is mounted in the passenger compartment, for example in the roof lining, door pillar lining, central column, etc.

The housing 2 subsequently receives a printed circuit board (PCB) 12 that rests on the upper face 13 of the housing 2, closing the opening 51. The PCB 12 is centered on the upper face 13 of the housing 2 by four centering pins arranged respectively at the four corners of the upper face 13 of the housing 2. (The centering pins are not visible in the drawing).

The PCB 12 supports the lighting source 14, typically one or more LEDs.

To optimize the alignment of the light beam generated by the lighting source 14 with respect to the optical axis of the light guide 10, and thus with respect to the PCB 12 supporting the lighting source 14, four centering pins 15 are formed around the light input face of the light guide 10. A single centering pin 15 is visible in the drawing. These pins are integral with the light guide 10, and cooperate respectively, by force, with through-holes formed in the thickness of the PCB 12.

The conductive plate 9 further comprises a conductive part defining a conductive metal tongue 90, integral with the plate 9 and shaped to extend outside the plane of the plate 9 in a general direction substantially perpendicular to the plane of the plate 9. The end of the tongue 90 defines an electrical contact 91 of an electrical connection between the conductive plate 9 and the PCB 12.

Advantageously, the contact 91 is not directly mechanically and electrically connected (by soldering, gluing, etc.) to the PCB 12, but rather the mechanical and electrical connection is formed by means of a flexible, electrically conductive sleeve 20, which is interposed between the contact 91 and a conductive receiving strip 21 of the PCB 12.

The sleeve 20 is formed for example from a polymer loaded with a conductive powder or conductive pigments, and may alternatively be of any type of adaptable, flexible material: a natural or synthetic rubber, a thermoplastic elastomer, silicone, a flexible polymer such as a viscoelastic polyurethane foam, or a cellulose polymer, or the like.

The sleeve 20 is advantageously carried and centered on a centering pin 22, onto which it is threaded over virtually its entire length.

The centering pin 22 is integral with the base wall 6 or, in the variant described above, with the insert 11 in the base wall 6. It extends perpendicular to the internal face of the base wall 6.

The centering pin has a general cylindrical shape, flaring gradually toward the base thereof. The base of the centering pin 22 is widened to define a planar, horizontal receiving surface 23 for the electrical contact 91.

The sleeve 20 advantageously has a hollow tube shape of general cylindrical shape of circular section, which, by resilient deformation about the centering pin 22, when it is threaded onto the centering pin 22, is held by force around the centering pin 22 and presses, via its base, on the receiving surface 23. The flared base of the sleeve 20 is mechanically fixed to the electrical contact 91. The length of the sleeve 20 is selected to be greater than the length (height) of the centering pin 22 as considered from the receiving surface 23 of the centering pin 22 to the free end thereof.

The cover 3 comprises, on the internal face thereof, a stop 24 that is integral with the cover 3 and that applies a pressure to the opposite face of the PCB supporting the light source 14. The stop 24 is arranged on the axis of the sleeve 20.

The cover 3 is brought onto the housing 2 and assembled with the housing by snapping in via the clipping means 4, and the internal elements are thus sandwiched between the housing 2 and the cover 3.

In this embodiment, all the internal elements are mounted to the interior of the housing 2, and it is the cover 3, brought onto the housing 2, that ensures that the internal elements of the housing 2 are placed under stress.

The assembly thus formed has to be able to meet the compromise between the holding of the internal elements without play and the clipping strain.

The flexible sleeve 20 makes it possible to ensure the clipping counter-reaction by way of its compression at the moment when the cover 3 is assembled with the housing 2.

It is the difference in length J between the sleeve 20 and the centering pin 22 (the length of the pin 20 is considered starting from the contact interface 91 with the base of the pin 20) that makes it possible for the sleeve 20 to deform by compression along its principal deformation axis and to absorb all of the assembly plays caused by tolerance intervals of the elements and by the wear thereon, so as to achieve zero-play assembly.

Moreover, advantageously, the sleeve 20 ensures a flexible electrical connection between the contact 91 and the light source supported by the PCB. A conductive track, not shown, connects the receiving surface 21 of the PCB to the light source or to the connection feet of the LED or LEDs 14.

By way of its compression along its principal deformation axis, the conductive powder pigments of the sleeve 20 are placed in contact and ensure electrical continuity over the entire length of the sleeve 20.

Thus, through the use of a single part, the conductive, flexible sleeve 20, according to the present invention, makes it possible to meet the two-fold constraint of ensuring zero-play assembly and reliable electrical contact between the lighting control touch interface, via the touch surface 7, and the light source 14.

A male connector 25, which makes it possible to connect the lighting device 1 electrically to an electrical supply bundle of the passenger compartment, not shown, is formed by contact pins 26, which are soldered to one end of the PCB 12. The housing of the connector 25, enclosing the contact pins 26, is integral with the housing 2.

The invention claimed is:

1. A lighting device comprising a housing accommodating at least one light source, said housing comprising an at least partially transparent wall supporting a touch interface for controlling the light source and allowing through light generated by the light source, and a cover closing the housing; the assembly formed by the housing and the cover being tightly assembled by clipping means;
    said lighting device further comprising a flexible mechanical and electrical connection means compressed between the touch interface and the light source allowing both control of the light source and compensation of the stresses exerted by the clipping means;
    the touch interface comprising a conductive surface fitting tightly against a base wall of said housing and comprising at least one conductive part extending from the conductive surface toward a printed circuit board mounted in said housing; a free end of said conductive part defining an electrical contact involved in the transmission of a lighting control signal to the printed circuit board to control the lighting of the light source;
    the mechanical and electrical connection means being arranged between the electrical contact and the printed circuit board; the mechanical and electrical connection means comprising a hollow tubular elastomer sleeve loaded with conductive pigment or powder, the density of the conductive pigment or powder being determined so as to provide electrical continuity between the electrical contact and the printed circuit board.

2. The lighting device according to claim 1, wherein the housing has a shape of a bowl, the bowl shape defining the base wall, said base wall supporting the touch interface, and an opening of said bowl being closed by the printed circuit board, the printed circuit board supporting the light source; the light source being oriented toward the base wall.

3. The lighting device according to claim 2, wherein an optical device is arranged between the base wall and the printed circuit board facing the light source, so as to guide the light as far as the base wall; said optical device comprising a light input face facing the light source and a light output face facing the base wall.

4. The lighting device according to claim 1, wherein the cover comprises a stop that exerts a contact force on the printed circuit board; said stop being centered on the tubular sleeve.

5. A motor vehicle comprising the lighting device according to claim 1, the lighting device being arranged within a passenger compartment of the motor vehicle.

6. The motor vehicle according to claim 5, wherein the lighting device is a reading light or ceiling light.

7. A lighting device comprising a housing accommodating at least one light source, said housing comprising an at least partially transparent wall supporting a touch interface for controlling the light source and allowing through light generated by the light source, and a cover closing the housing; the assembly formed by the housing and the cover being tightly assembled by clipping means, wherein the housing has a shape of a bowl, a base wall of the bowl supporting the touch interface and an opening of the bowl being closed by a printed circuit board supporting the light source; the light source being oriented toward the base wall; said lighting device further comprising;
- a flexible mechanical and electrical connection means compressed between the touch interface and the light source allowing both control of the light source and compensation of the stresses exerted by the clipping means,
- an optical device arranged between the base wall and the printed circuit board facing the light source, so as to guide the light as far as the base wall; said optical device comprising a light input face facing the light source and a light output face facing the base wall; and
- at least one centering pin cooperating with the printed circuit board so as to center the light input face of the optical device on the light source.

8. The lighting device according to claim 7, wherein the touch interface comprises a conductive surface fitting tightly against the base wall and comprising at least one conductive part extending from the conductive surface toward the printed circuit board; a free end of said conductive part defining an electrical contact involved in the transmission of a lighting control signal to the printed circuit board to control the lighting of the light source.

9. The lighting device according to claim 8, wherein the mechanical and electrical connection means is arranged between the electrical contact and the printed circuit board.

10. A motor vehicle comprising the lighting device according to claim 7, the lighting device being arranged within a passenger compartment of the motor vehicle.

11. The motor vehicle according to claim 10, wherein the lighting device is a reading light or ceiling light.

\* \* \* \* \*